3,062,846
(LOWER ALKOXY)METHYL ETHER DERIVATIVES
OF STEROIDS AND PROCESS THEREFOR
Josef Fried, Princeton, N.J., assignor to Olin Mathieson
 Chemical Corporation, New York, N.Y., a corporation
 of Virginia
No Drawing. Filed Apr. 28, 1961, Ser. No. 106,178
12 Claims. (Cl. 260—397.4)

This invention relates to the synthesis of steroids, and has for its object the provision of a new class of steroids and the provision of a new process by which they are made.

It has been found that when a steroid having an unhindered primary or secondary hydroxyl group is reacted with a lower alkyl acetal of formaldehyde and formaldehyde (or a source of formaldehyde) in the presence of a strong acid catalyst, a (lower alkoxy)methyl ether derivative is formed. By a steroid having an unhindered hydroxyl group is meant a steroid containing a hydroxyl group at one or more of the following positions: $1\alpha$, $1\beta$, $2\alpha$, $2\beta$, $3\alpha$, $3\beta$, $4\alpha$, $4\beta$, $6\alpha$, $6\beta$, $7\alpha$, $7\beta$, $11\alpha$, $12\alpha$, $12\beta$, $15\alpha$, $15\beta$, $16\alpha$, $16\beta$, 18 or 19. In addition, such steroids include those of the androstane series containing a $17\alpha$ or $17\beta$ hydroxyl group and those of the pregnane series containing a $20\alpha$, $20\beta$ or 21 hydroxyl group.

If more than one unhindered hydroxyl group is present in the steroid reactant and a poly-alkoxymethyl ether is formed, and assuming the hydroxyl groups involved display a difference in reactivity, the compound may be selectively hydrolyzed by treatment with an acid, such as a dilute mineral acid (e.g., aqueous sulfuric acid), or an organic acid (e.g., oxalic acid) to yield a less etherified product.

Although the process of this invention may be utilized with any steroid containing an unhindered hydroxyl group, the preferred steroid reactants are those of the pregnane series, particularly those of the general formula

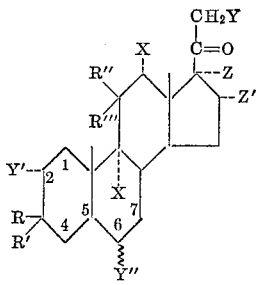

wherein the 1,2; 4,5; 5,6; and 6,7 positions are saturated or double-bonded; R is hydrogen, R' is $\alpha$-hydroxy, $\alpha$-acyloxy, $\beta$-hydroxy, or $\beta$-acyloxy or together R and R' is keto; R'' is hydrogen, R''' is $\alpha$-hydroxy, $\alpha$-acyloxy or $\beta$-hydroxy, or together R'' and R''' is keto; the X's are the same or different and represent hydrogen, halogen, or lower alkyl, at least one X being hydrogen; Y is hydrogen, hydroxy or acyloxy; Y' is hydrogen or methyl; Y'' is hydrogen, halogen or methyl; Z is hydrogen or hydroxy; and Z' is hydrogen, halogen, hydroxy, acyloxy, or methyl.

Examples of such steroids of the pregnane series include:

monohydroxylated steroids, such as
$11\alpha$-hydroxyprogesterone,
pregnenolone,
21-hydroxyprogesterone,
$12\alpha$-hydroxyprogesterone,
$15\alpha$-hydroxyprogesterone $\Delta^4$-pregnene-$20\beta$-ol-3-one,
$6\alpha$ and $6\beta$-hydroxyprogesterone and 19-hydroxyprogesterone;

dihydroxylated steroids, such as
$16\alpha,17\alpha$-dihydroxyprogesterone,
$11\alpha,21$-dihydroxyprogesterone,
$11\alpha,17\alpha$-dihydroxyprogesterone,
corticosterone,
$9\alpha$-halocorticosterone (e.g., $9\alpha$-fluorocorticosterone),
cortisone,
$9\alpha$-halocortisone,
prednisone,
$9\alpha$-haloprednisone (e.g., $9\alpha$-fluoroprednisone),
$6\alpha$-halo-$16\alpha,17\alpha$-dihydroxyprogesterone (e.g., $6\alpha$-fluoro-$16\alpha,17\alpha$-dihydroxyprogesterone),
$6\alpha$-methyl-$16\alpha,17\alpha$-dihydroxyprogesterone,
$12\alpha$-halocortisone,
$12\alpha$-haloprednisone;
trihydroxylated and tetrahydroxylated steroids, such as
hydrocortisone,
$9\alpha$-halohydrocortisones (e.g., $9\alpha$-fluorohydrocortisone and $9\alpha$-chlorohydrocortisone) prednisolone,
$9\alpha$-haloprednisolones (e.g., $9\alpha$-fluoroprednisolone and $9\alpha$-chloroprednisolone),
$\Delta^4$-pregnene-$11\alpha,17\alpha,21$-triol-3,20-dione,
$9\alpha$-halo-$16\alpha$-methylprednisolones (e.g., dexamethasone),
$12\alpha$-halohydrocortisones (e.g., $12\alpha$-fluorohydrocortisone and $12\alpha$-chlorohydrocortisone),
$12\alpha$-haloprednisolone (e.g., $12\alpha$-fluoroprednisolone, $6\alpha,12\alpha$-prednisolone),
$16\alpha$-hydroxyhydrocortisone,
$16\alpha$-hydroxycortisone,
$16\alpha$-hydroxyprednisolone,
$16\alpha$-hydroxyprednisone,
$9\alpha$-halo-$16\alpha$-hydroxyhydrocortisones (i.e., $9\alpha$-fluoro-$16\alpha$-hydroxyhydrocortisone, $9\alpha$-chloro-$16\alpha$-hydroxyhydrocortisone, $9\alpha$-bromo-$16\alpha$-hydroxyhydrocortisone and $9\alpha$-iodo-$16\alpha$-hydroxyhydrocortisone),
$9\alpha$-halo-$16\alpha$-hydroxycortisones,
$9\alpha$-halo-$16\alpha$-hydroxyprednisolone (e.g., triamcinolone),
$9\alpha$-halo-$16\alpha$-hydroxyprednisones,
$12\alpha$-halo-$16\alpha$-hydroxyhydrocortisones (e.g., $12\alpha$-fluoro-$16\alpha$-hydroxyhydrocortisone),
$12\alpha$-halo-$16\alpha$-hydroxycortisones (e.g., $12\alpha$-chloro-$16\alpha$-hydroxycortisone),
$12\alpha$-halo-$16\alpha$-hydroxyprednisolones (e.g., $12\alpha$-fluoro-$16\alpha$-hydroxyprednisolone),
$12\alpha$-halo-$16\alpha$-hydroxyprednisones,
$6\alpha$-methyl-$16\alpha$-hydroxyhydrocortisone,
$6\alpha$-methyl-$16\alpha$-hydroxycortisone,
$6\alpha$-methyl-$16\alpha$-hydroxyprednisolone,
$6\alpha$-methyl-$16\alpha$-hydroxyprednisone,
$2\alpha$-methyl-$16\alpha$-hydroxyhydrocortisone,
$2\alpha$-methyl-$16\alpha$-hydroxycortisone,
2-methyl-$16\alpha$-hydroxyprednisolone,
2-metyl-$16\alpha$-hydroxyprednisone,
$2\alpha,6\alpha$-dimethyl-$16\alpha$-hydroxyhydrocortisone,
$2\alpha,6\alpha$-dimethyl-$16\alpha$-hydroxycortisone,
$9\alpha$-halo-2-methyl-$16\alpha$-hydroxy prednisolones (e.g., 2-methyltriamcinolone),
$9\alpha$-halo-$6\alpha$-methyl-$16\alpha$-hydroxyhydrocortisones (e.g., $9\alpha$-fluoro-$6\alpha$-methyl-$16\alpha$-hydroxyhydrocortisone),
$9\alpha$-halo-$6\alpha$-methyl-$16\alpha$-hydroxyprednisolones (e.g., $6\alpha$-methyl triamcinolone),
$16\alpha$-hydroxy-6-dehydrocortisone,
$16\alpha$-hydroxy-6-dehydrohydrocortisone,
$16\alpha$-hydroxy-6-dehydroprednisolone,
$9\alpha$-halo-$16\alpha$-hydroxy-6-dehydroprednisolones,
$11\beta,16\alpha,17\alpha$-trihydroxyprogesterone,
11-keto-$16\alpha,17\alpha$-dihydroxyprogesterone,
$11\beta,16\alpha,17\alpha$-trihydroxy-1-dehydroprogesterone,
11-keto-$16\alpha,17\alpha$-dihydroxy-1-dehydroprogesterone,
$9\alpha$-halo-$11\beta,16\alpha,17\alpha$-trihydroxyprogesterones (e.g., $9\alpha$-chloro-$11\beta,16\alpha,17\alpha$-trihydroxyprogesterone and $9\alpha$-fluoro-$11\beta,16\alpha,17\alpha$-trihydroxyprogesterone), 9α-halo-16α,17α-dihydroxy-11-keto-progesterones (e.g.,
    9α-fluoro-16α,17α-dihydroxy-11-keto-progesterone),
9α-halo-11β,16α,17α-trihydroxy-1-dehydroprogesterones
    (e.g., 9α-fluoro-11β,16α,17α-trihydroxy-1-dehydro-
    progesterone),
12α-halo-11β,16α,17α-trihydroxyprogesterones (e.g.,
    12α-fluoro-11β,16α,17α-trihydroxyprogesterone),
12α-halo-11β,16α,17α-trihydroxy-1-dehydroprogesterones
    (e.g., 12α-fluoro-11β,16α,17α-trihydroxy-1-dehydro-
    progesterone),
21-halo-11β,16α,17α-trihydroxyprogesterones (e.g.,
    21-fluoro-11β,16α,17α-trihydroxyprogesterone),
21-halo-11β,16α,17α-trihydroxy-1-dehydroprogesterones,
9α,21-dihalo-11β,16α,17α-trihydroxyprogesterones (e.g.,
    9α,21-difluoro-11β,16α,17α-trihydroxyprogesterone),
9α,21-dihalo-6α-methyl-11β,16α,17α-trihydroxy-1-
    dehydroprogesterones,
16α-hydroxy-12α-(lower alkyl)-hydrocortisones (e.g.,
    16α-hydroxy-12α-methyl-hydrocortisone),
16α-hydroxy-12α-(lower alkyl)-cortisones (e.g.,
    16α-hydroxy-12α-methylcortisone),
16α-hydroxy-9α-(lower alkyl)-hydrocortisones (e.g.,
    16α-hydroxy-9α-methylhydrocortisone),
16α-hydroxy-9α-(lower alkyl)cortisones (e.g.,
    16α-hydroxy-9α-methyl-cortisone),
16α-hydroxy-12α-(lower alkyl)prednisolone (e.g.,
    16α-hydroxy-12α-methylprednisolone),
16α-hydroxy-[12α-(lower alkyl)prednisones,
16α-hydroxy-9α-(lower alkyl)prednisolones (e.g.,
    16α-hydroxy-9α-methylprednisolone),
16α-hydroxy]-9α-(lower alkyl)prednisones,
12α-(lower alkyl)-11β,16α,17α-trihydroxyprogesterones
    (e.g., 12α-methyl-11β,16α,17α-trihydroxyprogesterone),
9α-(lower alkyl)-11β,16α,17α-trihydroxyprogesterones
    (e.g., 9α-methyl-11β,16α,17α[trihydroxyprogesterone),
12α-(lower alkyl)-11-keto-16α,17α]-dihydroxy-
    progesterones,
9α-(lower alkyl)-11-keto-16α,17α-dihydroxy-
    progesterones,
12α-(lower alkyl)-Δ$^{4,6}$-pregnadiene-11β,16α,17α-triol-
    3,20-diones,
9α-(lower alkyl)-Δ$^{4,6}$-pregnadiene-11β,16α,17α-triol-
    3,20-diones,
12α-(lower alkyl)-Δ$^{1,4}$-pregnadiene-11β,16α,17α-triol-
    3,20-diones,
9α-(lower alkyl)-Δ$^{1,4}$-pregnadiene-11β,16α,17α-triol-
    3,20-diones,
12α-(lower alkyl)-Δ$^{1,4}$-pregnadiene-16α,17α-diol-
    3,11,20-triones,
9α-(lower alkyl)-Δ$^{1,4}$-pregnadiene-16α,17α-diol-3,11,20-
    triones,
9α-(lower alkyl)-Δ$^{1,4,6}$-pregnatriene-11β,16α,17α-diol-
    3,20-diones,
12α-(lower alkyl)-Δ$^{1,4,6}$-pregnatriene-11β,16α,17α-triol-
    3,20-diones,
12α-(lower alkyl)-Δ$^4$-pregnene-11α,16α,17α,21-tetrol-
    3,20-diones (e.g., 12α-methyl-Δ$^4$-pregnene-11α,16α,
    17α,21-tetrol-3,20-dione),
9α-(lower alkyl)-Δ$^4$-pregnene-11α,16α,17α,21-tetrol-
    3,20-diones (e.g., 9α-methyl-Δ$^4$-pregnene-11α,16α,
    17α,21-tetrol-3,20-dione),
12α-(lower alkyl)-Δ$^{1,4}$-pregnadiene-11α,16α,17α,21-
    tetrol-3,20-diones,
9α-(lower alkyl)-Δ$^{1,4}$-pregnadiene-11α,16α,17α,21-tetrol-
    3,20-diones,
12α-(lower alkyl)-Δ$^4$-pregnene-11α,16α,17α-triol-3,20-
    diones,
9α-(lower alkyl)-Δ$^4$-pregnene-11α,16α,17α-triol-3,20-
    diones,
12α-(lower alkyl)-Δ$^{1,4}$-pregnadiene-11α,16α,17α-triol-
    3,20-diones,
9α-(lower alkyl)-Δ$^{1,4}$-pregnadiene-11α,16α,17α-triol-
    3,20-diones and 11α-esters thereof, particularly esters with hydrocarbon carboxylic acids having less than ten carbon atoms.

In addition the process of this invention is applicable in treating steroids of the androstane series, particularly those of the general formula

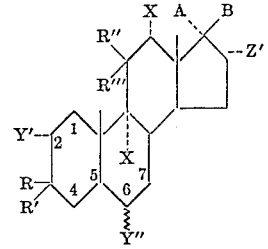

wherein the 1,2; 4,5; and 6,7-positions are saturated or double-bonded, and R, R', R'', R''', X, Y', Y'', and Z' are as hereinbefore defined, and A is hydrogen or lower alkyl, B is hydroxyl or acyloxy, or together A and B is keto. Examples of such steroids of the androstane series include: monohydroxylated steroids, such as testosterone 9α-fluoro-11-ketotestosterone 12α-fluoro-11-ketotestosterone, 16α-fluorotestosterone, 11α-hydroxyandrostenedione, etiocholanolone, androsterone and 19-nor-testosterone; dihydroxylated steroids, such as 9α-fluoro-11β - hydroxy - testosterone - 16α - hydroxy - testosterone, 15α-hydroxy - testosterone - 11α - hydroxy - 17α - methyl-testosterone, and 19-hydroxy-testosterone; and trihydroxylated steroids.

The formaldehyde used in the reaction can be supplied as such (e.g., as gaseous formaldehyde) or prepared in situ from a polymerized form of formaldehyde, such as trioxane. Among the suitable lower alkyl acetals of formaldehyde which may be used can be mentioned methylal, ethylal, and the butylalcetal of formaldehyde. The reaction is conducted in the presence of a strong acid catalyst. Suitable acids include perchloric acid and p-toluenesulfonic acid.

The alkoxymethyl ethers formed, which represent new compounds of this invention, are useful as intermediates in the synthesis of steroids. Thus, the process of this invention affords a method for protecting otherwise reactive alcoholic groups during future chemical operations on other parts of the molecule utilizing either neutral or alkaline reagents. As such, the products of this invention represent useful intermediates in steroidal syntheses. In addition, those compounds which are alkoxymethyl ether derivatives of physiologically active steroids, contrary to what would be expected, retain their activity and hence can be used for the same purpose as the parent compound. Thus, alkoxymethyl ether derivatives of glucocorticoids, such as triamcinolone and hydrocortisone, possess glucocorticoid activity and may be used in the treatment of rheumatoid arthritis.

The following examples illustrate the invention (all temperatures being in centigrade):

EXAMPLE 1

*3-Methoxymethylene-Δ$^5$-Pregnene-3β-Ol-20-One*

To a suspension of 1 g. of pregnenolone in 50 ml. of methylal and 20 g. of trioxane is added with stirring .5 ml. of 70% perchloric acid. The suspension clears within ½ minute and the reaction is allowed to proceed for 20 minutes. Six ml. of 1 N sodium hydroxide is then added and after dilution with water the methylal and trioxane are removed in vacuo. The residual suspension is extracted with chloroform, the chloroform extract washed with water, dried over sodium sulfate and evaporated to dryness in vacuo. The residue (about 1.18 g.) upon recrystallization from a small amount of acetone and mostly hexane furnishes the pure methoxymethylene derivative of pregnenolone possessing the following properties: M.P. about 102–104°; [α]$_D$ +19° (c., 1.32 chlf.);

$\lambda_{max}^{Nujol}$ No OH band, 5.87, 6.02 (weak) mμ

*Analysis.*—Calcd. for $C_{23}H_{36}O_3$ (360.52): C, 76.62; H, 10.07; $OCH_3$, 8.65. Found: C, 76.54; H, 9.97; $OCH_3$, 8.95.

EXAMPLE 2

*11-Methoxymethylene-11α-Hydroxyprogesterone*

To a suspension of 1 g. of 11α-hydroxyprogesterone in 50 ml. of methylal and 20 g. of trioxane is added with stirring at room temperature .5 ml. of 70% perchloric acid. The solution clears within 3 minutes and the reaction is allowed to proceed for a total of 30 minutes. Eight ml. of 1 N sodium hydroxide is added and the solution diluted with water. Evaporation in vacuo to remove methylal and trioxane leaves an aqueous suspension, which is extracted with chloroform, the chloroform washed with water, dried over sodium sulfate and evaporated to dryness in vacuo. The residual material is taken up in 5 ml. of benzene and 5 ml. of hexane and chromatographed on 20 g. of acid-washed alumina. Benzene-hexane 1:1 (1000 ml.) and benzene (500 ml.) elutes crystalline material, which after one recrystallization from acetone-hexane melts sharply at about 138–139°. The material has the following properties: $[\alpha]_D$ +169° (c., 1.37 chlf.);

$\lambda_{max.}^{alc.}$ 241 m$\mu$ ($\epsilon$=16,000); $\lambda_{max.}^{Nujol}$ No OH band, 5.91, 6.02, and 6.22$\mu$

*Analysis.*—Calcd. for $C_{23}H_{34}O_4$ (374.50): C, 73.76; H, 9.15; $OCH_3$, 8.28. Found: C, 73.50; H, 9.40; $OCH_3$, 10.29.

EXAMPLE 3

*17-Methoxymethylene-Testosterone*

Following the procedure of Example 2 but substituting 1 g. of testosterone for the 11α-hydroxyprogesterone, 17-methoxymethylene-testosterone is obtained.

EXAMPLE 4

*21-Methoxymethylene-9α-Fluorocortisol*

To a suspension of 200 mg. of 9α-fluorocortisol in 10 ml. of methylal and 8 g. of trioxane is added with stirring .1 ml. of 70% perchloric acid. The reaction is allowed to proceed at room temperature for 22 hours after which time dilute sodium bicarbonate and water is added. The methylal and trioxane are removed in vacuo and the residue extracted with chloroform. The chloroform extract is washed with water, dried over sodium sulfate and evaporated to dryness in vacuo. The residue is taken up in 4 ml. of chloroform and 2 ml. of benzene and chromatographed on 4.2 g. of acid-washed alumina. Elution with chloroform-benzene 2:1 (250 ml.) elutes about 96 mg. of crystalline material, which on recrystallization first from acetone-hexane and then from 95% ethanol furnishes pure 21-methoxymethylene-9α-fluorocortisol possessing the following properties: M.P. about 288–294°; $[\alpha]_D^{23}$ +43° (c., .65 chlf.);

$\lambda_{max.}^{alc.}$ 238 m$\mu$ ($\epsilon$=15,700); $\lambda_{max.}^{Nujol}$ 2.91, 5.82, 6.0 and (sh.) 6.15$\mu$

*Analysis.*—Calcd. for $C_{23}H_{33}O_6F$ (424.49): C, 65.06; H, 7.83. Found: C, 64.92; H, 7.50.

EXAMPLE 5

*21-Methoxymethylene-Cortisol*

Following the procedure of Example 4 but substituting 200 mg. of cortisol for the 9α-fluorocortisol, 21-methoxymethylene-cortisol is obtained.

EXAMPLE 6

*21-Methoxymethylene-Δ⁴-Pregnene-17α,21-Diol-3,20-Dione*

Following the procedure of Example 4 but substituting 200 mg. of Δ⁴-pregnene-17α,21-diol-3,20-dione for the 9α-fluorocortisol, 21-methoxymethylene-Δ⁴-pregnene-17α,21-diol-3,20-dione is obtained.

EXAMPLE 7

*16α,21-Bis-(Methoxymethylene) and 16α-Mono-(Methoxymethylene) Derivatives of Triamcinolone*

To a solution of 600 mg. of triamcinolone in 30 ml. of methylal and 24 g. of trioxane is added with stirring .3 ml. of 70% perchloric acid. The reaction is allowed to proceed at room temperature for 22 hours, after which time it is neutralized rapidly by the addition of sodium bicarbonate solution. Water is added, the mixture filtered and the methylal and trioxane removed in vacuo. The resulting crystalline precipitate about (400 mg.) is filtered and after recrystallization from 95% alcohol furnishes the pure bis-(methoxymethylene) derivative of triamcinolone possessing the following properties: M.P. about 218–219°; $[\alpha]_D$ +34° (c., 1.1 chlf.);

$\lambda_{max.}^{Nujol}$ 2.92, 5.81, 6.0, 6.14 and 6.22$\mu$

*Analysis.*—Calcd. for $C_{25}H_{35}O_8F$ (482.53): C, 62.22; H, 7.31; F, 4.02; $OCH_3$, 12.87. Found: C, 62.05; H, 7.58; F, 4.14; $OCH_3$, 14.67.

Chromatography of 100 mg. of this material on 2 g. of silicagel from a solution containing 4 ml. of chloroform and 16 ml. of benzene furnishes on elution with chloroform-benzene (1:4) pure material melting at about 224–225°.

Extraction of the aqueous mother liquors with chloroform furnishes after drying of the chloroform extract over sodium sulfate and evaporation of the solvent in vacuo about 370 mg. of material which after crystallization from 95% ethanol melts at about 188–200°. To achieve complete purification this material is dissolved in 4 ml. of chloroform and 8 ml. of benzene and chromatographed on 7 g. of silicagel. Elution with mixtures of chloroform, benzene and 100% cholroform eluted about 43 mg. of material, which is discarded. This is followed by the 16-mono-methoxymethylene derivative of triamcinolone when the elution is continued with chloroform containing 5% of acetone. The 16-mono-methoxymethylene derivative of triamcinolone obtained from 900 ml. of this eluant after three crystallizations from acetone-hexane has the following properties: M.P. about 220–223°; $[\alpha]_D^{23}$ +42° (c., .52 chlf.);

$\lambda_{max.}^{Nujol}$ 2.95, 5.88, 6.02, 6.18, and 6.23$\mu$

*Analysis.*—Calcd. for $C_{23}H_{31}O_7F$ (438.48): C, 63.00; H, 7.13. Found: C, 63.40; H, 7.39.

EXAMPLE 8

*16α-Mono-Methoxymethylene Derivative of Triamcinolone*

30 mg. of 16,21-bis-(methoxymethylene) triamcinolone in 10 ml. of methanol and .34 ml. of 14% aqueous sulfuric acid is heated at reflux for 2 hours, the mixtures neutralized with dilute sodium bicarbonate, the methanol removed in vacuo and the residual suspension extracted with chloroform. The residue (about 20 mg.) after crystallization from acetone-hexane melts at about 219–222° and possesses an infrared spectrum identical with that of 16-methoxymethylenetriamcinolone obtained in Example 7.

EXAMPLE 9

*21-Acetate of 16-Methoxymethylenetriamcinolone*

A solution of 33 mg. of 16-methoxymethylenetriamcinolone in 1 ml. of pyridine and .5 ml. of acetic anhydride is allowed to stand at room temperature for 18 hours. After removal of the reagents in vacuo the residual material is crystallized from acetone-hexane. After two crystallizations the material has the following properties: M.P. about 178–180°; $[\alpha]_D^{23}$ +32° (c., 1.02 chlf.);

$\lambda_{max.}^{alc.}$ 239 m$\mu$ ($\epsilon$=16,500); $\lambda_{max.}^{Nujol}$ 2.92, 5.71, 5.79, 6.01, 6.18, and 6.23$\mu$

*Analysis.*—Calcd. for $C_{25}H_{33}O_8F$ (480.51): C, 62.48; H, 6.92. Found: C, 61.66; H, 7.34.

EXAMPLE 10

*16,21-Bis-(Methoxymethylene) 9α-Fluoro-16α-Hydroxy Prednisone*

A solution of 50 mg. of 16,21-bis-(methoxymethylene) triamcinolone in 1 ml. of pyridine is added to a suspension of 50 mg. of chromium trioxide in 1 ml. of pyridine. The resulting mixture is allowed to remain at room temperature for 20 hours, after which time water and chloroform is added. The chloroform solution is washed with water to remove excess pyridine, dried over sodium sulfate and evaporated to dryness in vacuo. The amorphous residue is dissolved in 15 ml. of benzene and chromatographed on a column of 900 mg. of acid-washed alumina. Elution with 10% chloroform in benzene furnishes material, which after recrystallization from acetone-hexane melts at about 139–140°;

$\lambda_{max.}^{alc.}$ 234 mμ (ε=14,000); $[\alpha]_D^{23}$+83° (c., .41 chlf.); $\lambda_{max.}^{Nujol}$ 3.03, 5.80, 6.01, 6.17 and 6.23μ

*Analysis.*—Calcd. for $C_{25}H_{33}O_8F$ (480.51); C, 62.48; H, 6.92. Found: C, 62.44; H, 6.98.

EXAMPLE 11

*16,21-Bis-(Methoxymethylene)-16α-Hydroxy-9α-Fluorocortisol*

To a stirred suspension of 200 mg. of 16α-hydroxy-9α-fluorocortisol in 10 ml. of methylal and 8 g. of trioxane is added at room temperature .1 ml. of 70% perchloric acid. After 20 hours at room temperature all material has dissolved and the reaction mixture is neutralized by the addition of sodium bicarbonate solution. Water is added and the methylal and trioxane removed in vacuo. The resulting crystals are filtered, the aqueous mother liquor is extracted with chloroform and the chloroform extract taken to dryness in vacuo. The combined crystals and material from the chloroform extract (about 293 mg.) is dissolved in 2 ml. of chloroform and 8 ml. of benzene and chromatographed on 6 g. of silicagel Chloroform-benzene 1:4 (200 ml.) elutes approximately 25 mg. of material which is discarded. The bulk of the material is eluted with chloroform-benzene 4:1 (800 ml.) and with chloroform (150 ml.). Recrystallization of this material from acetone furnishes the pure bis-(methoxymethylene)-16α-hydroxy-9α-fluorocortisol possessing the following properties: M.P. about 213°; $[\alpha]_D^{23}$ +70° (c., .43 chlf.);

$\lambda_{max.}^{alc.}$ 239 mμ (ε=15,500); $\lambda_{max.}^{Nujol}$ 2.92, 5.84, 5.99 and 6.15μ

*Analysis.*—Calcd. for $C_{25}H_{37}O_8F$ (484.54): C, 61.96; H, 7.69. Found: C, 61.82; H, 7.18.

Similarly, by following the procedure of Example 11, but substituting an equivalent amount of the following steroids for the 16α-hydroxy-9α-fluorocortisol, the indicated product is formed:

| Steroid Reactant | Product: 16,21-Bis(methoxymethylene) |
|---|---|
| 6α-Fluorotriamcinolone | 6α-Fluorotriamcinolone. |
| 6α-Fluoro-16α-hydroxy-9α-fluorocortisol | 6α-Fluoro-16α-hydroxy-9α-fluorocortisol. |
| 16α-Hydroxycortisol | 16α-Hydroxycortisol. |
| 16α-Hydroxyprednisolone | 16α-Hydroxyprednisolone. |
| 6α-Methyl-16α-hydroxycortisol | 6α-Methyl-16α-hydroxycortisol. |

EXAMPLE 12

*16,21-Bis-(Ethoxymethylene)-16α-Hydroxy-9α-Fluorocortisol*

Following the procedure of Example 11 but substituting an equivalent amount of ethylal for the methylal, 16,21 - bis - (ethoxymethylene) - 16α - hydroxy - 9α-fluorocortisol is obtained.

Similarly, by substituting an equivalent amount of the dibutylacetal of formaldehyde for the methylal in Example 11 and following the procedure of the example, the corresponding 16,21-bis-butoxymethylene) derivative is obtained.

This invention may be variously otherwise embodied within the scope of the appended claims.

What is claimed is:

1. (Lower alkoxy)methyl ether of a steroid of the general formula

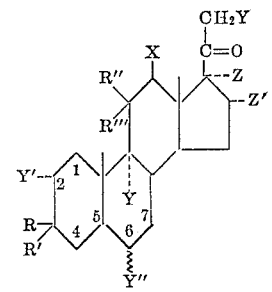

wherein the 1,2; 4,5; 5,6; and 6,7 positions are saturated or double-bonded; R is hydrogen, R' is β-hydroxy and together R and R' is keto; R'' is hydrogen, R''' is selected from the group consisting of α-hydroxy, α-acyloxy and β-hydroxy, and together R'' and R' is keto; the X's are each selected from the group consisting of hydrogen, halogen and lower alkyl, at least one X being hydrogen; Y is selected from the group consisting of hydrogen, hydroxy and acyloxy; Y' is selected from the group consisting of hydrogen and methyl; Y'' is selected from the group consisting of hydrogen, halogen and methyl; Z is selected from the group consisting of hydrogen and hydroxy; and Z' is selected from the group consisting of hydrogen, hydroxy, and methyl.

2. A process for preparing a (lower alkoxy)methyl ether of a steroid of the androstane and pregnane series having an unhindered hydroxyl group, which comprises reacting said steroid with a lower alkyl acetal of formaldehyde and formaldehyde in the presence of a strong acid catalyst selected from the group consisting of perchloric acid and p-toluenesulfonic acid.

3. The process of claim 2 wherein the formaldehyde is prepared in situ by the reaction of a polymer of formaldehyde with said strong acid.

4. A process for preparing a methoxymethyl ether of a steroid of the androstane and pregnane series having an unhindered hydroxyl group, which comprises reacting said steroid with methylal and trioxane in the presence of a strong acid catalyst selected from the group consisting of perchloric acid and p-toluenesulfonic acid.

5. A process for preparing a 16,21-di-(lower alkoxy)-methyl ether of a steroid of the pregnane series having hydroxyl groups in at least the 16α-, 17α- and 21-positions, which comprises reacting said steroid with a lower alkyl acetal of formaldehyde and formaldehyde in the presence of a strong acid catalyst selected from the group consisting of perchloric acid and p-toluenesulfonic acid.

6. The process of claim 5 wherein the formaldehyde is prepared in situ by the reaction of a polymer of formaldehyde with said strong acid.

7. The process of claim 5 wherein the di(lower alkoxy)-methyl ether is then hydrolyzed to a mono-ether compound by treatment with a mineral acid.

8. A compound of the formula

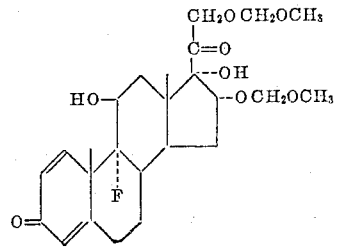

9. A compound of the formula
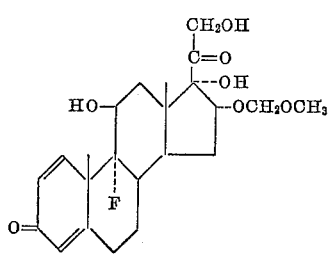
10. A compound of the formula
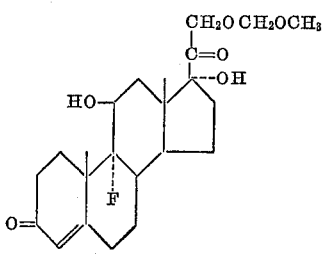
11. A compound of the formula
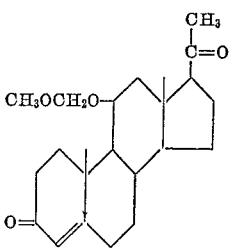
12. A compound of the formula
No references cited.